United States Patent
Chiu et al.

(10) Patent No.: US 7,109,688 B1
(45) Date of Patent: Sep. 19, 2006

(54) APPARATUS AND METHOD FOR MONOTONIC START UP OF A SYNCHRONOUS SWITCHING REGULATOR

(75) Inventors: Kwok-Fu Chiu, San Jose, CA (US); Barry James Culpepper, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 55 days.

(21) Appl. No.: 10/981,892

(22) Filed: Nov. 5, 2004

(51) Int. Cl.
G05F 1/656 (2006.01)
G05F 1/652 (2006.01)

(52) U.S. Cl. ............... 323/222; 323/284; 323/286
(58) Field of Classification Search ............ 323/222, 323/282, 284, 286
See application file for complete search history.

(56) References Cited

U.S. PATENT DOCUMENTS 5,986,895 A * 11/1999 Stewart et al. ............... 363/16
6,101,104 A * 8/2000 Eng ........................ 363/21.06
6,198,638 B1 * 3/2001 Lee ........................ 363/21.14

OTHER PUBLICATIONS

Texas Instrument, "Low-Input Voltage-Mode Synchronous Buck Controller", TPS 40000, TPS 40001, TPS 40002, TPS 40003, TPS 40004, TPS 40005, SLUS507C—Jan. 2002—Revised Jun. 2004, pp. 1-19, can be found at www.ti.com.

* cited by examiner

Primary Examiner—Bao Q. Vu
(74) Attorney, Agent, or Firm—Darby & Darby, P.C.; Matthew M. Gaffney

(57) ABSTRACT

A controller for a synchronous switching regulator is arranged to control a switch with a control signal, and to control a synchronous switch with a synchronous switch control signal. The controller disables the synchronous switch control signal at power-up so that the regulator operates with asynchronous rectification. Also, the controller is arranged to detect whether the regulator is in discontinuous or continuous conduction mode by determining whether a switch node voltage at the switch node a switch node stays negative. The regulator keeps operating with asynchronous rectification until the switch node voltage stays negative for the entire off period of the switch, which indicates the regulator is operating in continuous conduction mode. At this point, the controller enables assertion of the synchronous switch control signal, so that the regulator operates with synchronous rectification. The controller is arranged to enable the output voltage to rise monotonically when driving a prebiased load.

20 Claims, 6 Drawing Sheets

US 7,109,688 B1

APPARATUS AND METHOD FOR MONOTONIC START UP OF A SYNCHRONOUS SWITCHING REGULATOR

FIELD OF THE INVENTION

The invention is related to switching regulators, and in particular, to an apparatus and method for a switching regulator in which closing of the synchronous switch is enabled when the switching regulator starts operating in continuous conduction mode.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to rectify the inductor current. In contrast, a synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1:
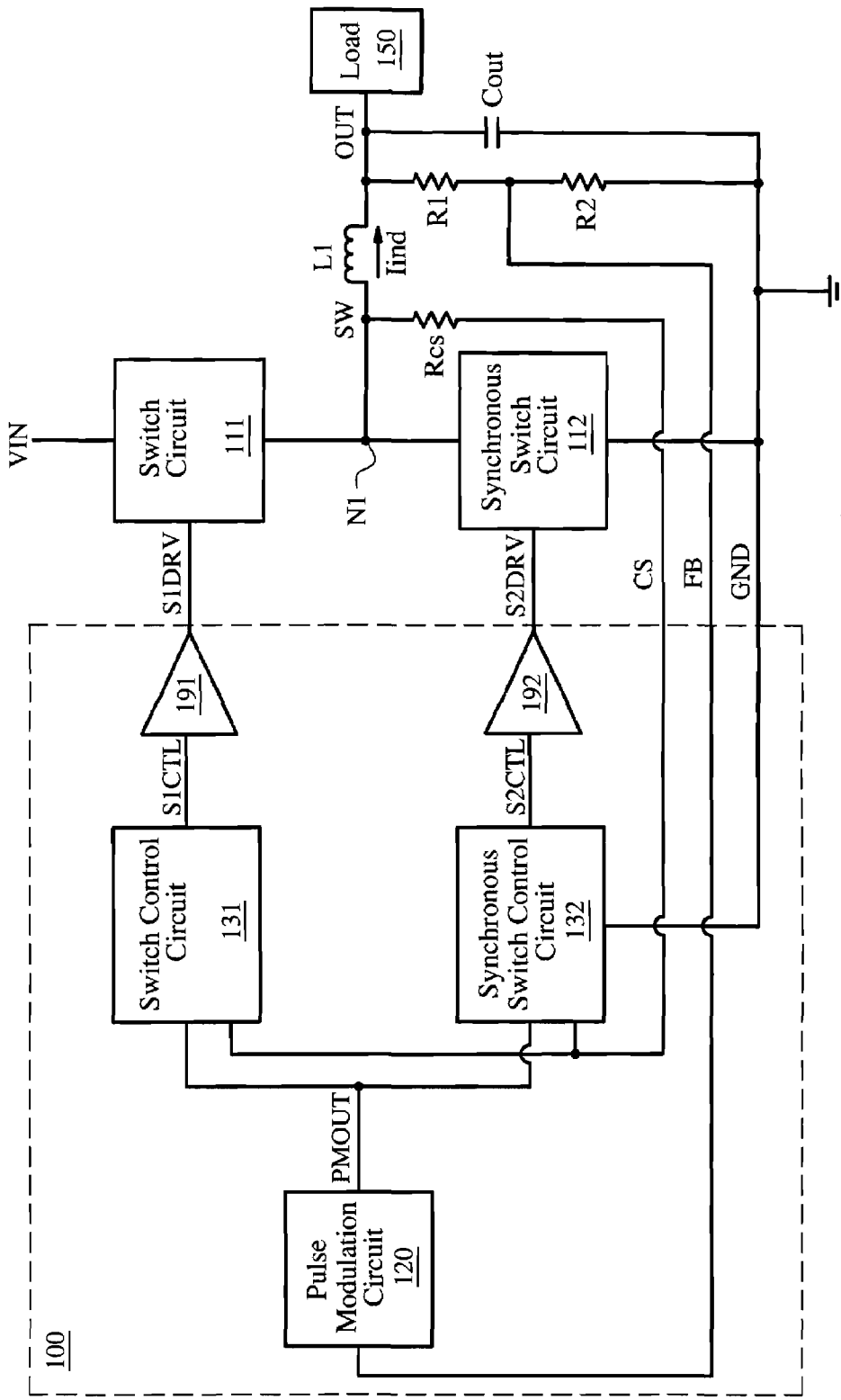
FIG. 1 illustrates a block diagram of an embodiment of a regulator.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar junction transistor (BJT) may be employed as an embodiment of a transistor, the scope of the words "gate", "drain", and "source" includes "base", "collector", and "emitter", respectively, and vice versa. The term "prebiased load" means at least a load that has a non-zero voltage prior to active regulation.

Briefly stated, the invention is related to a controller for a synchronous switching regulator that may be employed to prevent a dip in output voltage during power-up of the system for a prebiased (or precharged) load. The controller is arranged to control a switch with a control signal, and to control a synchronous switch with a synchronous switch control signal. The controller disables the synchronous switch control signal at power-up so that the regulator operates with asynchronous rectification. Also, the controller is arranged to detect whether the regulator is in discontinuous or continuous conduction mode by determining whether a switch node voltage at a switch node stays negative during asynchronous rectification at the time that the switch is off. If the switch node voltage does not stay negative during the asynchronous rectification at the time that the switch is off, this indicates that the regulator is operating in discontinuous conduction mode. The regulator operates with asynchronous rectification until the switch node voltage stays negative for the entire off period of the switch, which indicates the regulator is operating in continuous conduction mode. At this point, the controller enables assertion of the synchronous switch control signal, so that the regulator operates with synchronous rectification.

FIG. 1 illustrates a block diagram of an embodiment of regulator 101. Regulator 101 includes controller 100 and external components. In one embodiment, the external components include switch circuit 111, synchronous switch circuit 112, resistor Rcs, voltage divider resistors R1 and R2, inductor L1, output capacitor Cout, and load 150.

Regulator 101 is illustrated as a synchronous buck regulator in FIG. 1. However, the invention is not so limited, and other topologies are within the scope and spirit of the invention. For example, a boost regulator, flyback regulator, or the like may be employed. Also, although voltage regulation based on feedback voltage FB provided by voltage divider resistors R1 and R2 is illustrated in FIG. 1, current regulation may be employed in another embodiment. Also, FIG. 1 illustrates an embodiment which includes resistor Rcs, which may be employed to set a current limit value. In other embodiments, resistor Rcs need not be included in regulator 101.

Although one skilled in the art will appreciate that these topologies and others may be employed within the scope and spirit of the invention, operation with respect to a buck topology with regulation accomplished via a feedback voltage is described below for illustrative purposes.

Switch circuit 111 is arranged to open and close based on signal S1DRV. Similarly, synchronous switch circuit 112 is arranged to open and close based on signal S2DRV. Voltage SW at switch node N1 is based on whether switch circuits 111 and 112 are open or closed. More specifically, switch circuit 111 couples signal VIN to node N1 if switch circuit 111 is closed, and synchronous switch circuit 112 couples ground voltage GND to node N1 if synchronous switch circuit 112 is closed.

Additionally, inductor L1 is arranged to provide inductor current Iind to output capacitor Cout based, in part, on voltage SW such that output voltage OUT is provided. Resistors R1 and R2 are arranged to operate as a voltage divider to provide feedback voltage FB from voltage OUT. Also, pulse modulation circuit 120 is arranged to provide pulse modulation output signal PMOUT based, in part, on voltage OUT. In one embodiment, pulse modulation circuit 120 includes a pulse width modulation (PWM) circuit (not shown). Pulse modulation circuit 120 may also include an error amplifier that compares signal FB to a reference signal, and provides an error signal in response to the comparison. The PWM circuit may perform pulse width modulation on the error signal to provide signal PMOUT. In another embodiment, pulse modulation circuit 120 includes a pulse frequency modulation (PFM) circuit. Pulse modulation circuit 120 employs a soft-start at power-up so that the modulated parameter (e.g. duty cycle for a PWM) is relatively gradually increased during the soft-start. Due to the relatively gradual increase in duty cycle, inductor current Iind increases relatively gradually. Accordingly, detecting the transition from discontinuous conduction mode (DCM) to continuous conduction mode (CCM) is relatively easy employing aspects of the present invention.

Switch control circuit 131 is arranged to provide first switch control signal S1CTL, and synchronous switch control circuit 132 is arranged to provide synchronous switch control signal S2CTL. Further, driver circuit 191 is arranged to provide signal S1DRV from signal S1CTL, and driver circuit 192 is arranged to provide signal S2DRV from signal S2CTL.

In FIG. 1, synchronous switch control circuit 132 is shown as receiving signal CS. In another embodiment, synchronous switch control circuit 132 receives voltage SW instead signal CS or in addition to signal CS. In another embodiment, synchronous switch control circuit 132 receives another signal that is based on voltage SW. In either case, synchronous switch control circuit 132 receives a signal that is based, at least in part, on voltage SW.

Synchronous switch control circuit 132 is arranged to provide synchronous switch control signal S2CTL such that signal S2CTL based, in part, on signal PMOUT. Further, synchronous switch control circuit 132 is arranged to provide signal S2CTL such that assertion of the synchronous switch control signal is disabled during a discontinuous conduction mode (DCM) associated with the switch node current at node N1 (i.e. current Iind), and such that the assertion of the synchronous switch control signal is enabled when a continuous conduction mode (CCM) associated with current Iind. The timing is not necessarily exact so that the synchronous switch control signal may be enabled "substantially when" the continuous conduction mode occurs.

Synchronous switch control circuit 132 is arranged to disable or enable the assertion of signal S2CTL based on whether regulator 101 is operation in CCM, rather than basing the enabling on whether regulator 101 has reached the regulation point (i.e. whether the regulator has reached the desired output voltage). Whether regulator 101 has reached the regulation point is independent of whether the regulator is operation in CCM, since whether regulator 101 has reached the regulation point is dependent on load 150.

Regulator 101 may be said to be operating in "discontinuous conduction mode" when current Iind is zero for part of each cycle, and may be said to be operating in "continuous conduction mode" when current Iind is non-zero throughout the entire cycle.

In one embodiment, load 150 may be a pre-biased load or a pre-charged load before power-up. In this embodiment, regulator 101 starts up with a substantially monotonically increasing output voltage. The output voltage does not dip during power-up even if load 150 is a pre-biased or pre-charged load.

In one embodiment, one or more components shown as external components in FIG. 1 may be internal to controller 100, and one or more components shown as internal to controller 100 may be external to controller 100. For example, in one embodiment, drivers 191 and 192 are included in controller 100. In another embodiment, drivers 191 and 192 are external to controller 100. In one embodiment, controller 100 is included an integrated circuit, and components external to controller 100 are not included in the integrated circuit. In another embodiment, one or more components external to controller 100 are also included in the integrated circuit. In one embodiment, controller 100 includes driver circuit 191 and 192 and does not include switch circuit 111 or circuit circuit 112. In this embodiment, synchronous control circuit may employ signal CS to approximately detect the voltage SW so that the integrated circuit does not need an extra pin for receiving voltage SW. In another embodiment, the integrated circuit includes a pin to receive voltage SW. In yet another embodiment, the integrated circuit includes switch circuit 111 and synchronous switch circuit 112, so that node N1 is included in the integrated circuit.

Figure 2:
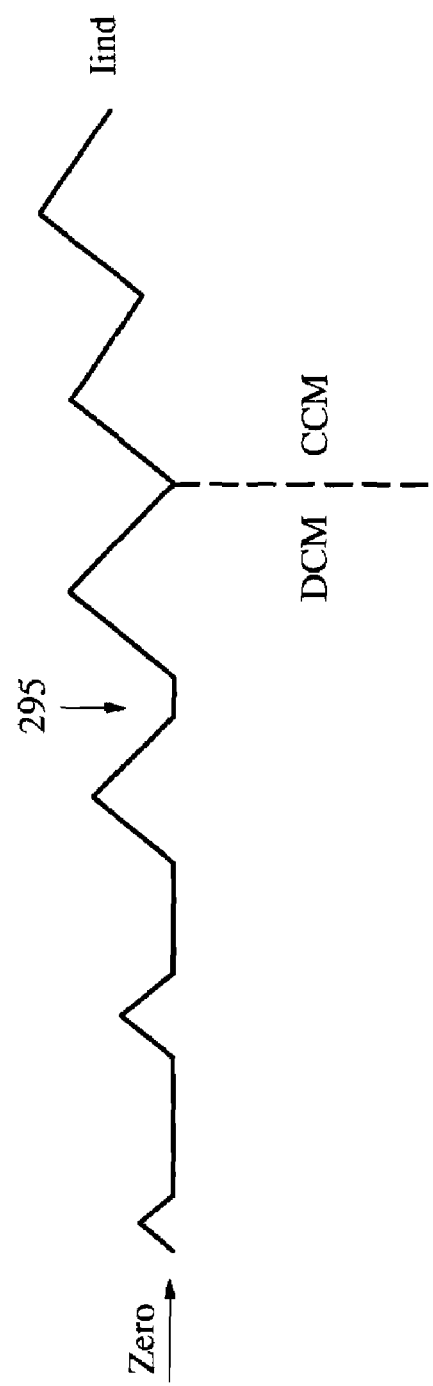
FIG. 2 shows a timing diagram of a waveform of an embodiment of the inductor current of FIG. 1.

FIG. 2 shows a timing diagram of waveform 295 of inductor current Iind for an embodiment of regulator 101 that employs buck regulation and pulse width modulation. When signal S1DRV is asserted, switch circuit 111 closes, causing current Iind to ramp upwards. When signal S1DRV is de-asserted, current Iind decreases back to substantially zero. If, at this point, the next cycle has not started yet, and synchronous switch circuit 112 is off, current Iind remains at substantially zero until the next clock. The peak of current Iind increases due to the increasing on-time of switch circuit 111. The peak of current Iind keeps increasing until continuous conduction mode occurs, where current Iind does not reach zero. At this point, synchronous switch control circuit 132 detects that regulator 101 is operating in continuous conduction mode, and enables the assertion of signal S2CTL. Accordingly, at this point, synchronous switch circuit 112 turns on when switch circuit 111 is turned off.

Figure 3:
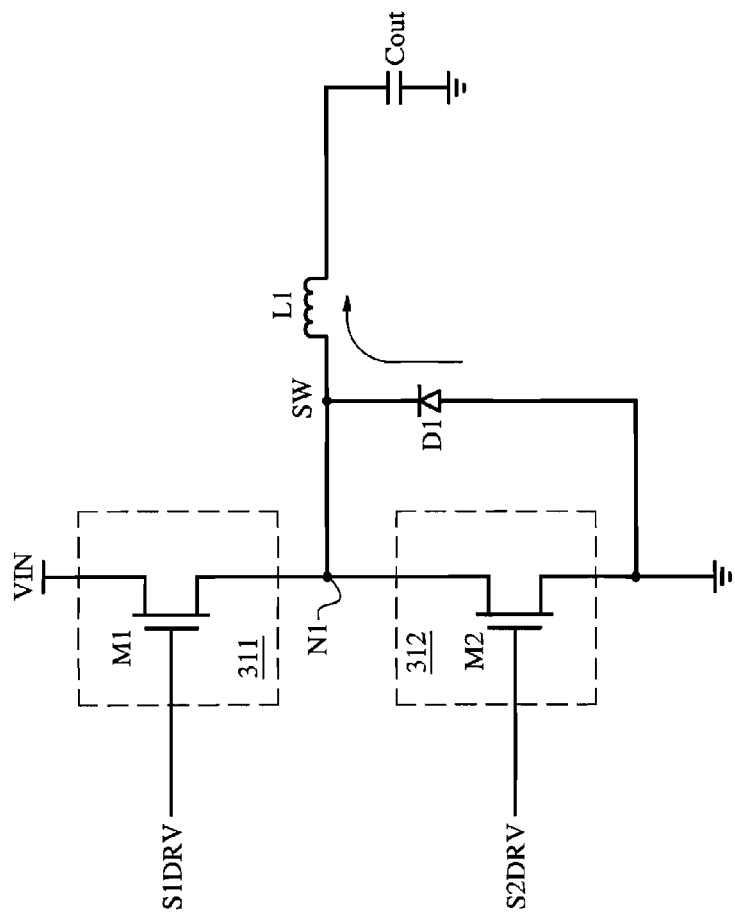
FIG. 3 illustrates a portion of an embodiment of the regulator of FIG. 1.

FIG. 3 illustrates an embodiment of portion 302 of an embodiment of regulator 101 of FIG. 1. Portion 302 includes switch circuit 311, synchronous switch circuit 312, inductor L1, and capacitor Cout. Components in portion 302 may operate in a similar manner to similarly-named components in regulator 101 of FIG. 1, and may operate in a different manner in some ways. Switch circuit 311 includes transistor M1. Similarly, switch circuit 312 includes transistor M2. A parasitic body diode D1 in transistor M2 is also illustrated in FIG. 3.

If current Iind is positive and transistors M1 and M2 are off, current Iind will go through body diode D1 of transistor M2. Accordingly, node N1 has a negative potential. When current L1 is zero, node N1 is in high impedance and exceeds zero potential.

Accordingly, if voltage SW is less than zero during the entire time window that transistor M1 is off during a clock cycle, current Iind is positive. Accordingly, in one embodiment, synchronous switch control circuit 132 is arranged to determine whether regulator 101 is in continuous mode by determining whether voltage SW is less than zero while transistor M2 is off for a cycle.

Portion 302 may further include a circuit element diode in addition to or in place of parasitic body diode D1.

Figure 4:
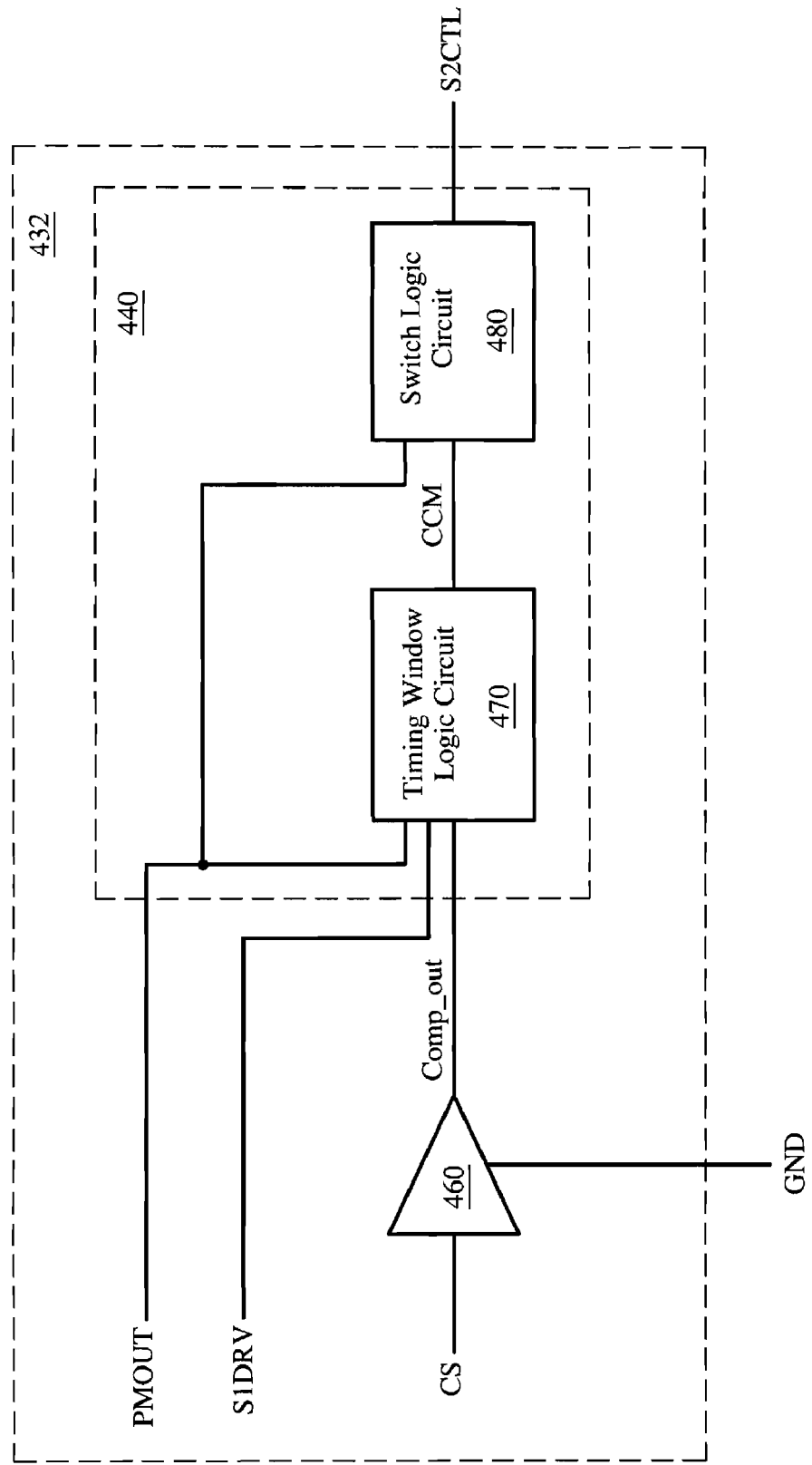
FIG. 4 shows a block diagram of an embodiment of the synchronous switch control circuit of FIG. 1.

FIG. 4 shows a block diagram of an embodiment of synchronous switch control circuit 432. Synchronous switch control circuit 432 may be employed as an embodiment of synchronous switch control circuit 132 of FIG. 1. Synchronous switch control circuit 432 includes comparator circuit 460 and synchronous switch logic circuit 440. In one embodiment, synchronous switch logic circuit 440 includes timing window logic circuit 470 and switch logic circuit 480.

In operation, comparator circuit 460 trips if the comparison input signal reaches voltage GND, and asserts signal Comp_out if comparator circuit 460 trips. In one embodiment, the comparison input signal is signal CS, as shown in FIG. 4. In another embodiment, the comparison input signal is voltage SW. If signal CS is used instead of signal SW, the trip voltage of comparator circuit 460 may be shifted an amount corresponding to the voltage offset between signal CS and signal SW. In yet another embodiment, the comparison input signal is another signal that is based, in part, on voltage SW. In one embodiment, comparator circuit 460 employs hysteresis. In another embodiment, comparator circuit 460 does not employ hysteresis.

Timing window logic circuit 470 is arranged to provide signal CCM such that signal CCM is asserted, approximately when the regulator (e.g. regulator 101 of FIG. 1) is operating in continuous current mode. Timing window logic circuit 470 is arranged to provide signal CCM based, in part, on signal Comp_out, and further based on a signal that is based, at least in part, on signal PMOUT (e.g. signal PMOUT and/or signal S1DRV). Timing window logic circuit 470 is arranged to receive at least one signal that is based on signal PMOUT. In the embodiment shown in FIG. 4, timing window logic circuit 470 receives signals PMOUT and S1DRV.

In one embodiment, timing window logic circuit 470 is arranged to assert signal CCM at approximately when signal Comp_out remains not asserted during the part of the cycle in which signal S1DRV is not asserted, as described above with regard to FIG. 3.

Also, switch logic circuit 480 is arranged to provide synchronous switch control signal S2CTL based, in part, on signal CCM and signal PMOUT. In one embodiment, switch logic circuit 380 may operate in a manner similar to conventional logic for providing a signal for controlling a synchronous switch for a synchronous regulator, except that switch logic circuit 480 is arranged such that assertion of signal S2CTL is enabled or disabled based on signal CCM. More specifically, switch logic circuit 480 is arranged to provide signal S2CTL such that the assertion of signal S2CTL is disabled if signal CCM is not asserted.

Although a particular arrangement of logic is illustrated in FIG. 4, the invention is not so limited. For example, in FIG. 4, timing window logic circuit 470 and switch logic circuit 480 are shown as separate circuits. However, in some embodiments, logic for determining whether the circuit is within the correct timing window may be intermingled with other logic for determining signal S2CTL. Similarly, in some embodiments, the comparison performed by comparator circuit 460 may be intermingled with the timing window logic and/or other logic for determining signal S2CTL.

Synchronous switch control logic circuit 432 is configured to provide signal S2CTL for controlling a synchronous switch for controlling a synchronous regulator, and further configured to disable or enable the assertion of signal S2CTL based on whether the synchronous regulator is operating in DCM or CCM, respectively. Different arrangements of synchronous switch control circuit 432 may be employed within the scope and spirit of the invention.

Figure 5:
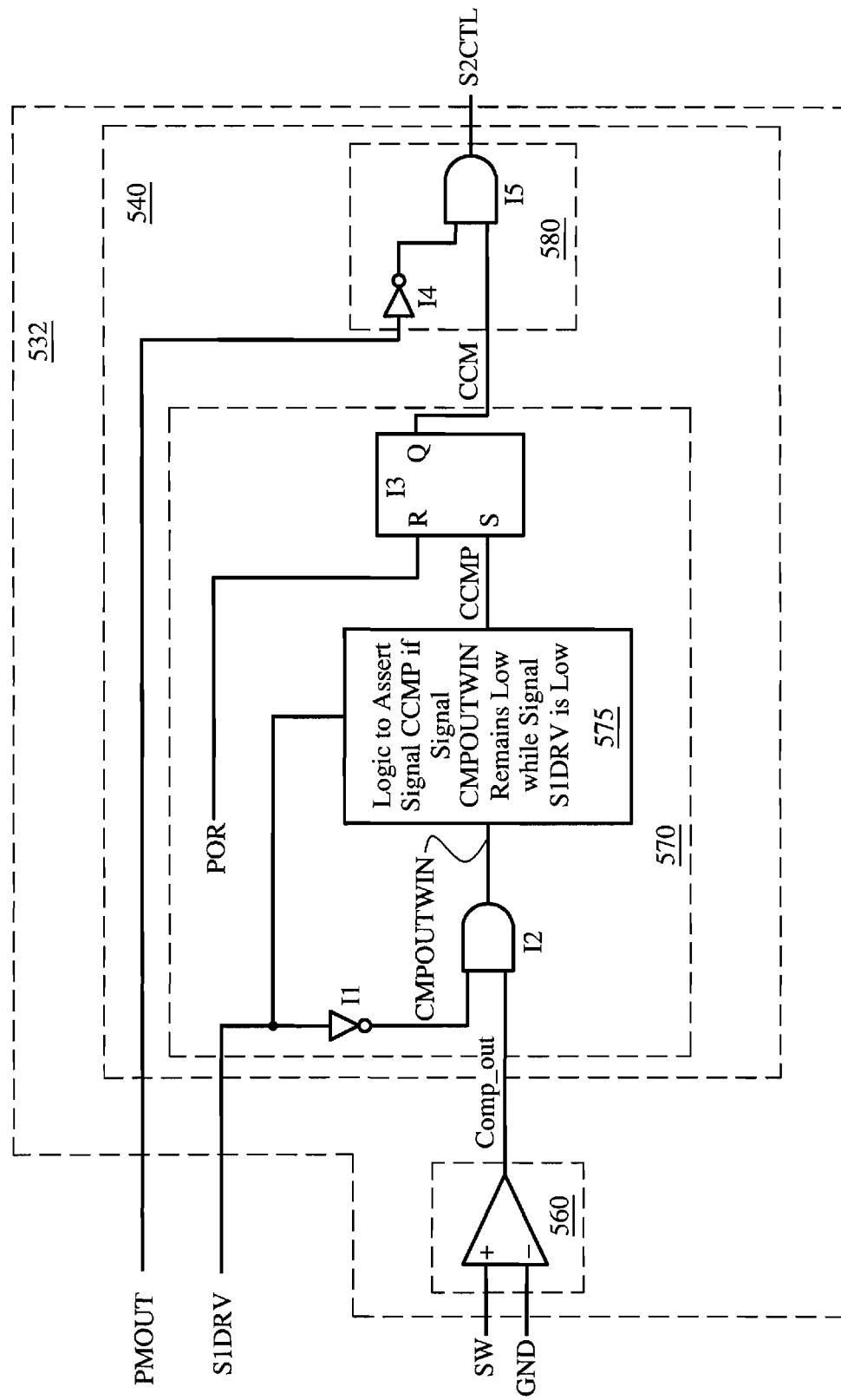
FIG. 5 illustrates a simplified functional diagram of an embodiment of the synchronous switch control circuit of FIG. 4.

FIG. 5 illustrates a simplified block functional diagram of an embodiment of synchronous switch control circuit 532. Synchronous switch control circuit 532 may be employed as an embodiment of synchronous switch control circuit 432 of FIG. 4. A simplified functional block for comparator circuit 560 includes a comparator that provides signal Comp_out based on a comparison of signal SW with signal GND. A simplified functional block diagram of timing window logic circuit 570 includes inverter I1, AND gate I2, logic block 575, and RS latch I3. A simplified functional block for switch logic circuit 580 includes inverter I2 and AND gate I3.

AND gate I2 is arranged to provide an AND function on signal Comp_out and an inverted version of signal S1DRV, to provide signal CMPOUTWIN. Logic block 575 is arranged to assert signal CCMP (asserted high in this embodiment) if signal CMPOUTWIN remains low while signal S1DRV is not asserted. RS latch I3 is configured to assert signal CCM if signal CCMP is asserted, and further configured to reset signal CCM at power-on reset (POR).

Also, AND gate I5 is arranged to provide signal S2CTL based on an AND function performed on signal CCM and an inverted version of signal PMOUT.

In the embodiment shown in FIG. 5, signal Comp_out and signal CCM are asserted high. However, other embodiments, signal Comp_out and/or signal CCM may be asserted low, and the logic may be changed accordingly.

Figure 6:
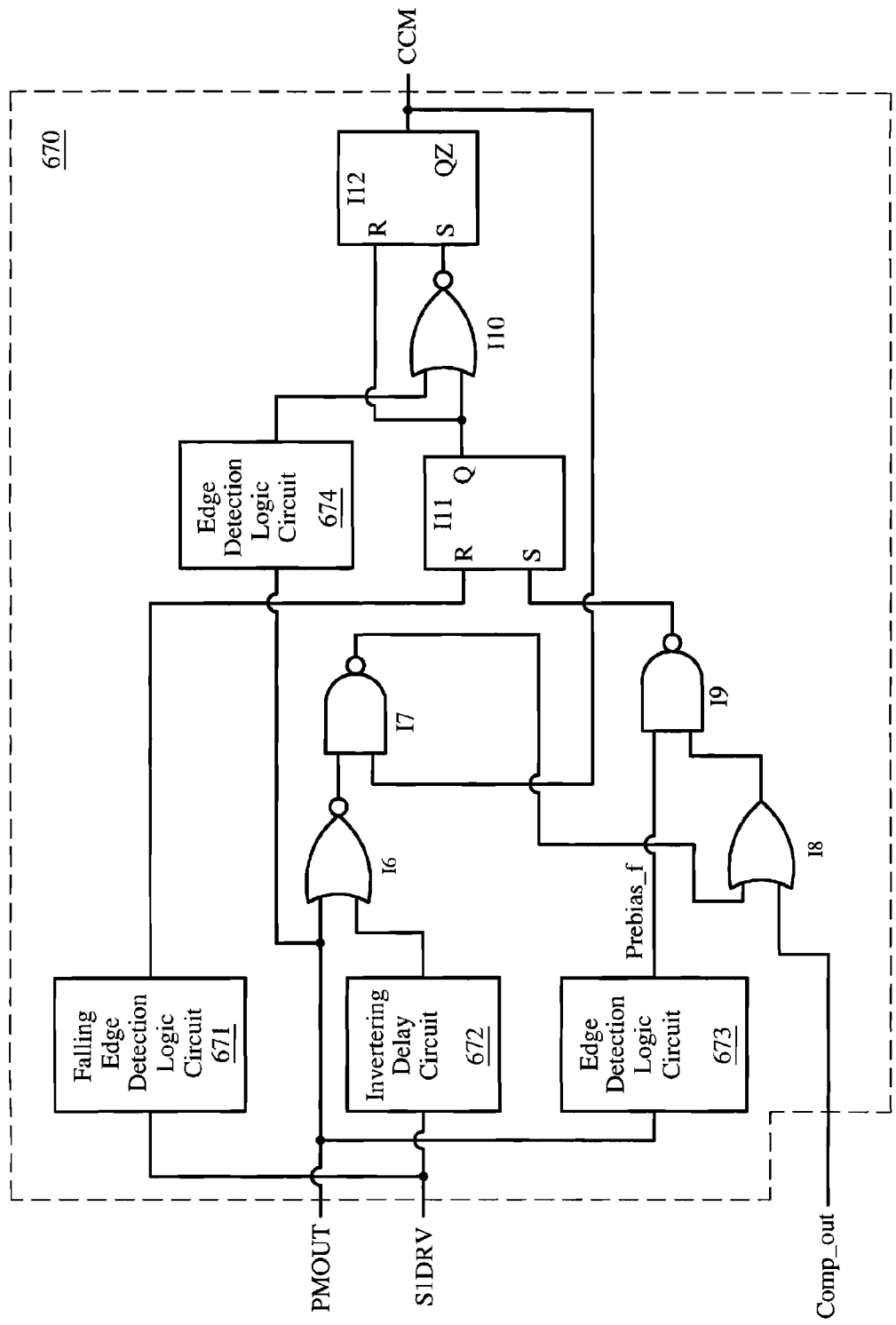
FIG. 6 shows a block diagram of an embodiment of the timing logic circuit of FIG. 4, arranged in accordance with aspects of the invention.

FIG. 6 shows a block diagram of an embodiment of timing logic circuit 670. Timing logic circuit 670 may be employed as an embodiment of timing window logic circuit 470 of FIG. 4. Timing window logic circuit 670 includes falling edge detection logic circuit 671, inverting delay circuit 672, edge detection logic circuit 673, edge detection logic circuit 674, logic gates I6–I10, and RS latches I11 and I12. In the embodiment shown in FIG. 6, signal Comp_out and signal CCM are asserted low. However, in other embodiments, signal Comp_out and/or signal CCM may be asserted high, and the logic may be changed accordingly.

In operation, inverting delay circuit 672 provides an inverted, delayed version of signal S1DRV. In one embodiment, inverting delay circuit 672 includes three inverters and a capacitor. NOR gate I6 is arranged to provide a NOR function on signal PMOUT and the inverted, delayed version of signal S1DRV. Accordingly, the output signal of NOR gate I6 is asserted (high) from the time that signal PM_OUT changes to an unasserted logic level (low), and remains high until a pre-determined delay period after signal S1DRV changes to an unasserted logic level (low).

Also, NAND gate I7 is arranged to perform a NAND function on output signal of NOR gate I6 and signal CCM. The output signal of NAND gate I7 is asserted (low) if the output signal of NOR gate I6 is asserted (high) and signal CCM corresponds to an unasserted logic level (high). This way, in conjunction with other logic in timing window circuit 670, once signal CCM is asserted, it remains asserted until the controller (e.g. controller 100 of FIG. 1) is powered down.

OR gate I8 is arranged to perform an OR function on the output signal of NAND gate I7 and signal Comp_out.

Accordingly, the output signal of OR gate I8 is asserted (low) if signal the output signal of NAND gate I7 is asserted (low) and signal Comp_out is asserted (low).

Additionally, edge detection logic circuit 673 is arranged to de-assert signal Prebias_f at power-up, and further arranged to assert (high) signal Prebias_f when a rising edge is detected in signal PMOUT. NAND gate I9 is arranged to perform a NAND function. The output signal of NAND gate I9 is asserted (high) if the output of OR gate I8 is asserted (low), or if signal Prebias_f is asserted (low). This way, in conjunction with the other logic in timing window circuit 470, signal CCM cannot be asserted until signal PMOUT begins switching high and low.

RS latch I11 has a set input that is coupled to the output of NAND gate I9, and a reset input that is coupled to the output of falling edge detection logic circuit 671. Additionally, falling edge detection logic circuit 671 is configured to assert the output signal of falling edge detection logic circuit 671 if a falling edge occurs in signal 671. Accordingly, RS latch I11 is set before signal PMOUT begins switching, and is also set if signal Comp_out is asserted during the timing window in which the output signal of NAND gate I7 is asserted. Also, RS latch I11 is reset each time a falling edge occurs in signal S1DRV.

Edge detection logic circuit 674 is arranged to assert (high) an output signal of edge detection logic circuit 674 when a rising edge occurs in signal PMOUT. Further, NOR gate I10 is arranged to perform a NOR function on the output signal of edge detection logic circuit 674 and the signal provided by the Q output of RS latch 111. Accordingly, the output signal provided by NOR gate I10 is asserted (high) if latch I11 was not set during the part of the cycle in which signal PMOUT is low. RS latch I12 is arranged to set when the output signal of NOR gate I10 is asserted (high). Further, RS latch I12 is arranged to assert signal CCM (low) at a QZ output of RS latch I12 when RS latch I12 is set.

In one embodiment, circuitry in one or more circuits in timing window logic circuit 670 may be shared with circuitry in one or more other circuits in timing window logic circuit 670. For example, in one embodiment, a portion of delay circuit 672 is employed as a portion of delay circuitry within falling edge detection logic circuit 671.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for regulation, comprising:
   a pulse modulation circuit that is arranged to provide a pulse modulation output signal based, in part, on an output signal; and
   a synchronous switch control circuit that is arranged to provide a synchronous switch control signal such that the synchronous switch control signal is based, in part, on the pulse modulation output signal; assertion of the synchronous switch control signal is disabled, substantially during a discontinuous conduction mode associated with a switch node current at a switch node; and such that the assertion of the synchronous switch control signal is enabled, substantially during a continuous conduction mode associated with the switch node current, wherein the pulse modulation circuit and the synchronous switch control circuit are configured to operate with a first switch circuit and a synchronous switch circuit coupled together at the switch node to enable regulation of the output signal.

2. The circuit of claim 1, wherein the synchronous switch control circuit is configured to determine whether the switch node current is associated with the discontinuous or the continuous conduction mode by determining whether a voltage at the switch node is greater than approximately zero approximately while the first switch circuit is substantially closed open.

3. The circuit of claim 1, wherein the synchronous switch control circuit includes:
   a comparator circuit that is arranged to perform a comparison based, in part, on a comparison input voltage that is based on a voltage at the switch node.

4. The circuit of claim 1, wherein the synchronous switch control circuit includes:
   a comparator circuit that is arranged to compare a comparison input voltage that is based on a voltage at the switch node with a substantially zero voltage, and further arranged to provide a comparison output signal based on the comparison.

5. The circuit of claim 4, wherein the synchronous switch control circuit further includes:
   a timing window logic circuit that is configured to provide a CCM signal that is based, in part, on the comparison output signal; and further based, in part, on the pulse modulation output signal, such that the CCM signal is asserted, approximately when the switch node current is associated with the continuous conduction mode.

6. The circuit of claim 4, wherein the first switch circuit includes a first switch transistor that includes a gate, and wherein the synchronous switch control circuit further includes:
   a timing window logic circuit that is configured to provide a CCM signal that is based the comparison output signal, and further based, in part, on the pulse modulation output signal, such that the CCM signal is asserted if a voltage that is associated with the voltage at the switch node is less than approximately zero during substantially a time that a voltage at the gate of the switch transistor corresponds to an unasserted logic level for a cycle.

7. The circuit of claim 6, wherein the synchronous switch control circuit further includes:
   a switch logic circuit that is arranged to provide the synchronous switch control signal based, in part, on the CCM signal and the pulse modulation output signal.

8. The circuit of claim 6, further comprising:
   a first switch driver circuit that is arranged to provide the voltage at the gate of the first switch transistor based on a first switch control signal, wherein the first switch control signal is based, in part, on the pulse modulation output signal; and
   a synchronous switch driver circuit that is arranged to drive the synchronous switch circuit based on the synchronous switch control signal.

9. A circuit for regulation, comprising:
   a comparator circuit that is arranged to compare a comparison input voltage that is associated with a voltage at a switch node to a ground voltage; and
   a synchronous switch logic circuit that is arranged to provide a synchronous switch control signal to a control input of a synchronous switch circuit such that the synchronous control signal is based, in part, on an output signal; and further based, in part, on the comparison, wherein the comparator circuit and the synchronous switch circuit are configured to operate with a first switch circuit and the synchronous switch circuit coupled together at the switch node to enable regulation of the output signal.

10. The circuit of claim 9, further comprising:
a pulse modulation circuit that is arranged to provide a pulse modulation output signal based, in part, on the output signal.

11. The circuit of claim 10, wherein the synchronous switch logic circuit includes:
a timing window logic circuit that is configured to provide a CCM signal based on the comparison, and further based, in part, on the pulse modulation output signal, such that the CCM signal is asserted, approximately when the switch node is in continuous current mode.

12. The circuit of claim 10, wherein the synchronous switch logic circuit includes:
a timing window logic circuit that is configured to provide a CCM signal that is based the comparison output signal, and further based, in part, on the pulse modulation output signal, such that the CCM signal is asserted if a voltage that is associated with the voltage at the switch node is less than approximately zero during substantially a time that a voltage at the gate of the switch transistor corresponds to an unasserted logic level for a cycle.

13. The circuit of claim 12, wherein the synchronous switch logic circuit further includes:
a switch logic circuit that is arranged to provide the synchronous switch control signal based, in part, on the CCM signal and the pulse modulation output signal such that assertion of the synchronous switch control signal is enabled or disabled based on the CCM signal.

14. A method for starting up a synchronous switching regulator, comprising:
when the synchronous switching regulator is powered up, disabling an assertion of a synchronous switch control signal, wherein the synchronous switch control signal is employed to control a synchronous switch of the synchronous switching regulator;
determining whether the synchronous switching regulator is operating in continuous conduction mode; and
if the synchronous switching regulator is operating in continuous conduction mode, enabling the assertion of the synchronous switch control signal.

15. The method of claim 14, wherein determining whether the synchronous switching regulator is operating in continuous conduction mode includes:

determining whether a voltage at a switch node is greater than approximately zero approximately while the switch circuit is substantially open.

16. The method of claim 15, wherein determining whether the voltage at the switch node is greater than approximately zero while the switch circuit is substantially open includes:
determining whether a voltage at a current limit node is greater than approximately zero approximately while the switch circuit is substantially open.

17. The method of claim 15, comprising:
providing a pulse modulation output signal based, in part, on an output signal; and
providing, to a first switch, a first switch control signal based, in part, on the pulse modulation output signal, wherein first switch is coupled to the switch node, and wherein the synchronous switch is coupled to the switch node.

18. The method of claim 17, wherein determining whether the voltage at the switch node is greater than approximately zero while the switch circuit is substantially open includes:
comparing a ground voltage with a voltage that is based on the voltage at the switch node;
asserting a comparison signal if the voltage that is based on the voltage at the switch node is greater than the ground voltage;
determining whether at least one timing condition is satisfied;
asserting an intermediate signal if the comparison signal is asserted and the at least one timing condition is satisfied;
de-asserting the intermediate signal if at least one other timing condition is satisfied; and
asserting the CCM signal if the intermediate signal is not asserted substantially during a rising edge of the pulse modulation output signal.

19. The method of claim 18, wherein determining if at least one timing condition is satisfied includes determining if the pulse modulation output signal is low after the pulse modulation output signal begins oscillating.

20. The method of claim 18, wherein the first switch includes a first switch transistor including a gate, and wherein determining if the at least one other timing condition is satisfied includes determining if a falling edge occurs in a voltage of the gate of the first switch transistor.

* * * * *

UNITED STATES PATENT AND TRADEMARK OFFICE
CERTIFICATE OF CORRECTION

PATENT NO.         : 7,109,688 B1                                           Page 1 of 1
APPLICATION NO. : 10/981892
DATED              : September 19, 2006
INVENTOR(S)        : Kwok-Fu Chiu et al.

It is certified that error appears in the above-identified patent and that said Letters Patent is hereby corrected as shown below:

Sheet 6 of 6 (Box 672), (Fig. 6), Line 1, Delete "Invertering" and insert -- Inverting --.

Column 4, Line 25, Delete "circuit" before "112".

Column 7, Line 9, Delete "18" and insert -- I8 --.

Column 7, Line 30, Delete "111." and insert -- I11. --.

Column 8, Line 35, In Claim 6, after "based" insert -- on --.

Column 9, Line 18, In Claim 12, after "based" insert -- on --.

Signed and Sealed this

Twenty-third Day of January, 2007

JON W. DUDAS
*Director of the United States Patent and Trademark Office*